United States Patent
Shirazi et al.

(10) Patent No.: US 10,356,567 B2
(45) Date of Patent: Jul. 16, 2019

(54) MULTI-CHANNEL COMMUNICATION SYSTEM

(71) Applicant: Nexmo, Inc., San Francisco, CA (US)

(72) Inventors: Jack Shirazi, Middlesex (GB); Tiago Lam, London (GB); Eric Nadalin, London (GB); Chris Moore, Piedmont, CA (US); Sumit Suman, San Francisco, CA (US)

(73) Assignee: NEXMO, Inc., San Francisco, CA (US)

(*) Notice: Subject to any disclaimer, the term of this patent is extended or adjusted under 35 U.S.C. 154(b) by 0 days.

(21) Appl. No.: 15/006,429

(22) Filed: Jan. 26, 2016

(65) Prior Publication Data

US 2016/0286526 A1    Sep. 29, 2016

Related U.S. Application Data

(60) Provisional application No. 62/137,592, filed on Mar. 24, 2015.

(51) Int. Cl.
*H04W 4/00* (2018.01)
*H04W 4/12* (2009.01)
(Continued)

(52) U.S. Cl.
CPC ............ *H04W 4/12* (2013.01); *H04M 15/41* (2013.01); *H04M 15/61* (2013.01);
(Continued)

(58) Field of Classification Search
None
See application file for complete search history.

(56) References Cited

U.S. PATENT DOCUMENTS

| 5,720,003 A | 2/1998 | Chiang et al. |
| 5,928,363 A | 7/1999 | Ruvolo |

(Continued)

FOREIGN PATENT DOCUMENTS

| EP | 1289202 A1 | 3/2003 |
| WO | WO-03/063411 A1 | 7/2003 |

(Continued)

OTHER PUBLICATIONS

Nexmo SMS Deliverability Guide; https://web.archive.org/web/20121021023442/http://nexmo.com/download/nexmo_sms_deliverability guide.pdf; Oct. 21, 2012; 10pgs.

(Continued)

*Primary Examiner* — Minh Trang T Nguyen
(74) *Attorney, Agent, or Firm* — FisherBroyles, LLP; Joseph Pagnotta (57) ABSTRACT

Methods, systems, and apparatus, including computer programs encoded on a computer storage medium, for receiving from a first system information comprising a message and an identifier of a user, selecting a channel from a plurality of different third party communication channels for sending the message based on one or more properties of communications on the channel, determining a channel-specific user identifier for the selected channel based on the identifier of the user, creating a channel-specific message formatted for the selected channel based on the message, and sending the message to the user on the selected channel using the channel-specific user identifier.

28 Claims, 5 Drawing Sheets

(51) Int. Cl.
  *H04M 15/00* (2006.01)
  *H04W 4/24* (2018.01)
  *H04W 4/21* (2018.01)
  *H04W 48/18* (2009.01)

(52) U.S. Cl.
  CPC ......... *H04M 15/8221* (2013.01); *H04W 4/24* (2013.01); *H04W 4/21* (2018.02); *H04W 48/18* (2013.01)

(56) References Cited

U.S. PATENT DOCUMENTS

| | | | |
|---|---|---|---|
| 8,738,051 B2 | 5/2014 | Nowack et al. | |
| 8,792,867 B1* | 7/2014 | Negahban | H04W 4/90 455/414.1 |
| 9,300,792 B2 | 3/2016 | Gonen et al. | |
| 2008/0183827 A1 | 7/2008 | Rege et al. | |
| 2008/0275785 A1 | 11/2008 | Altberg et al. | |
| 2009/0023425 A1* | 1/2009 | Hosain | H04M 3/5116 455/412.1 |
| 2011/0238766 A1 | 9/2011 | Lew et al. | |
| 2012/0117178 A1 | 5/2012 | Price et al. | |
| 2012/0330856 A1 | 12/2012 | Hyder et al. | |
| 2013/0036458 A1 | 2/2013 | Liberman et al. | |
| 2013/0041957 A1 | 2/2013 | Davenport et al. | |
| 2014/0075525 A1 | 3/2014 | Ferlin | |
| 2014/0344913 A1* | 11/2014 | Stahl | H04L 12/1403 726/11 |
| 2014/0364082 A1* | 12/2014 | Baddeley | H04W 40/02 455/406 |

FOREIGN PATENT DOCUMENTS

| | | |
|---|---|---|
| WO | WO-2011/132181 A1 | 10/2011 |
| WO | WO-2012/006659 A1 | 1/2012 |

OTHER PUBLICATIONS

Int'l Search Report and Written Opinion of the ISA/EP in PCT/US2015/031535; dated Aug. 25, 2015; 10pgs.
Jun. 16, 2016 International Search Report issued in International Application No. PCT/US2016/020667.
Jun. 16, 2016 Written Opinion issued in International Application No. PCT/US2016/020667.
U.S. Appl. No. 14/338,580, filed Jul. 23, 2014, Systems and Methods for Adaptive Routing, Lee, et al.
U.S. Appl. No. 14/552,349, filed Nov. 24, 2014, Identity and Phone Number Verification, Soulez, et al.
U.S. Appl. No. 14/816,892, filed Aug. 3, 2015, Systems and Methods for Adaptive Routing, Nadalin, et al.
U.S. Appl. No. 62/137,592, filed Mar. 24, 2015, Multi-channel Communication System, Shirazi, et al.

* cited by examiner

MULTI-CHANNEL COMMUNICATION SYSTEM

CROSS REFERENCE TO RELATED APPLICATIONS

This application claims priority from U.S. Patent Application No. 62/137,592, filed Mar. 24, 2015, entitled "MULTI-CHANNEL COMMUNICATION SYSTEM," and is related to U.S. patent application Ser. No. 14/552,349, filed Nov. 24, 2014, entitled "IDENTITY AND PHONE NUMBER VERIFICATION," each of which is incorporated herein by reference.

BACKGROUND

This specification relates to multi-channel communication delivery and, in particular, to adaptively selecting communication channels and providing two-way communication over those channels.

Messages can be transmitted between mobile phones or other computing devices over public switched telephone networks (PSTN), cellular networks (e.g., Global System for Mobile Communication or GSM network), or computer networks such as the Internet. For example, Short Message Service (SMS) is a text messaging service that enables text message transmissions between two or more mobile phones. Instant messaging software applications such as LINE (by Line Corporation, Tokyo, Japan), WhatsApp (by Facebook, Inc., Menlo Park, Calif.), and WeChat (by Tencent, ShenZhen, Guangdong, China) enable text and rich-media (e.g., image, animation, video) message transmissions between mobile phones or computing devices over the Internet. A business (e.g., a retailer, brand, or service) can reach consumers by using various communication channels such as phone calls, emails, SMS messaging, or OTT messaging. For instance, a brand (e.g., for household products) can send to a consumer a LINE message including promotional text and graphics, and a coupon for a dishwasher detergent. Or an airline can send a flight status update to a consumer using an SMS message. A challenge for a business trying to reach a consumer can be determining the best available messaging channel to reach the consumer and mitigating the complexity of communicating over different channels that have differing protocols and security requirements.

SUMMARY

In general, one aspect of the subject matter described in this specification can be embodied in methods that include the actions of receiving from a first system information comprising a message and an identifier of a user; selecting a channel from a plurality of different third party communication channels for sending the message based on one or more properties of communications on the channel; determining a channel-specific user identifier for the selected channel based on the identifier of the user; creating a channel-specific message formatted for the selected channel based on the message; and sending the message to the user on the selected channel using the channel-specific user identifier. Other embodiments of this aspect include corresponding systems, apparatus, and computer programs.

These and other aspects can optionally include one or more of the following features. The aspect can further comprise verifying that credentials are valid for the first system; and after verifying that the credentials for the first system are valid, sending the message. The selected channel can be a social network and wherein the channel-specific user identifier can be a user account name on the social network. The selected channel can be a public switched telephone network and wherein the channel-specific user identifier can be a telephone number. The selected channel can be GSM (Global System for Mobile Communications) and wherein the channel-specific user identifier can be a telephone number. The identifier of the user can comprise a telephone number. A particular third party communication channel can be an over-the-top provider, GSM, or a public switched telephone network. The aspect can further comprise receiving from a second system information comprising a second message, an identifier of a second user, and an identifier of a particular channel; and sending the second message to the second user on the particular channel. A particular property of communications on the channel can comprise a cost to send a message on the channel, a payment made to a sender of a message through the channel, a quality of service of the channel, delivery receipts, or reachability of the user through the channel. Selecting a channel from a plurality of different channels for sending the message based on one or more properties of communication on the channel can comprise selecting a particular channel using a rule-based system wherein a particular rule of the rule-based system corresponds to a set of one or more required properties for the message. The required properties can be determined by metadata associated with at least the message. One or more rules of the rule-based system can be periodically updated by a machine learning system with input comprising respective past performance data for each property on each of the plurality of third party communication channels. The aspect can further comprise determining that the sending failed and based thereon, selecting a second channel from the plurality of channels; determining a second channel-specific user identifier for the user; and sending the message to the user on the second channel using the second channel-specific user identifier. The message can comprise one or more of text, an image, video, audio, executable code, and programming language statements. The aspect can further comprise receiving a second message from the user on the selected channel in response to the message; and forwarding the second message to the first system.

Another aspect of the subject matter described in this specification can be embodied in methods that include the actions of receiving, using a first communication protocol, information from a remote system comprising a message and specifying a recipient and an Over-the-Top (OTT) channel; selecting a second communication protocol from a plurality of different communication protocols based on the specified OTT channel wherein the first protocol is different from the second protocol; determining an OTT user identifier for the recipient based on the OTT channel; sending the message to the OTT user identifier on the OTT channel using the second protocol; receiving a response message from the OTT user identifier on the OTT channel using the second protocol; and sending the response message to the remote system using the first protocol. Other embodiments of this aspect include corresponding systems, apparatus, and computer programs.

The aspect can further comprise validating the remote system with the OTT channel using the second protocol. An OTT channel can be a social networking system or a messaging system. The OTT user identifier can be an account name on the OTT channel. The OTT user identifier can be a phone number. Sending the message to the OTT user identifier on the OTT channel can comprise formatting the message to comply with the second protocol; and sending the formatted message to the OTT user identifier on the OTT channel using the second protocol. The aspect can further comprise receiving, using the first communication protocol, information from a second remote system comprising a second message and specifying a second recipient and a second OTT channel; selecting a third communication protocol from the plurality of different communication protocols based on the specified OTT channel; determining a second OTT user identifier for the second recipient based on the second OTT channel; sending the second message to the second OTT user identifier on the second OTT channel using the third protocol. The aspect can further comprise validating the second remote system with the second OTT channel using the third protocol. The aspect can further comprise receiving a second response message from the second OTT user identifier on the second OTT channel using the third protocol, and sending the second response message to the remote system using the first protocol.

Particular implementations of the subject matter described in this specification can be implemented to realize one or more of the following advantages. The system described herein provides a flexible message delivery system for transmitting messages to users and facilitating two-way communication. The two-way communication can comprise message sending or can be live telephone or video communication. The system automatically selects, from multiple communication channels, the most effective or economical communication channel to use at a given point in time, and transmits a message or initiates a communication to the user according to a protocol for the selected communication channel. The system enables a sender to communicate through one of many possible communication channels via a single application program interface (API). The API hides the complexity of the different communication channels so that the sender does not need to implement channel-specific protocols or authentication in order to communicate with a given user regardless of what channel is used. The functionality of the API is implemented by a server system that can be scaled to handle very large numbers of senders. In addition, the server system learns over time what channels work best to reach a given user based on observing how properties of the channels and communications on the channels change.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
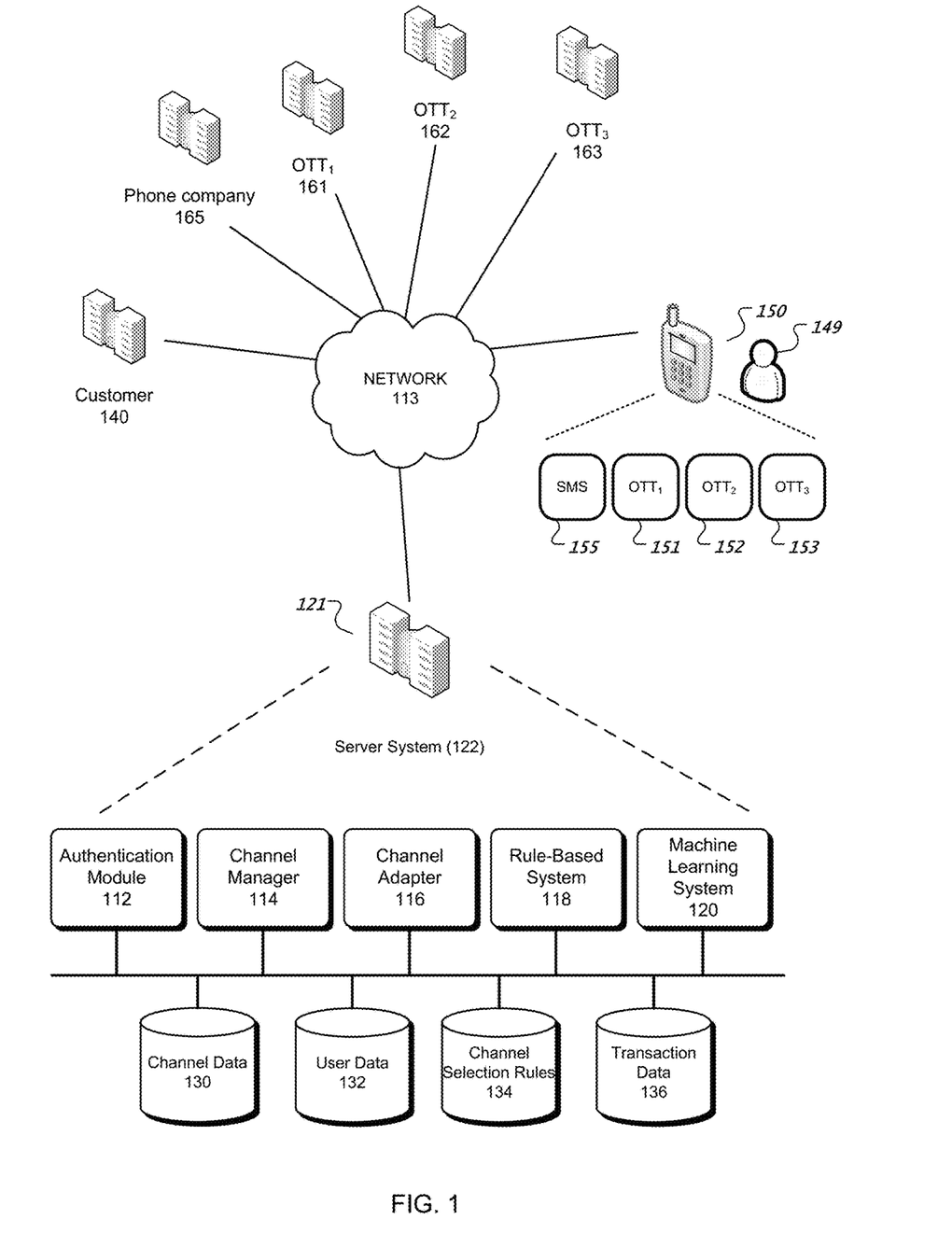
FIG. 1 illustrates an example system for multi-channel communication.

FIG. 1 illustrates an example system for multi-channel communication. The server system 122 implements functionality to facilitate communication with users using a variety of different types of communication channels. In particular, the server system 122 manages communications between third parties such as businesses (e.g., customer 140) and users (e.g., user 149) by means of OTT messaging services (e.g., $OTT_1$ 161, $OTT_2$ 162, $OTT_3$ 163), or other communication services such as public switched telephone networks (PSTNs) and cellular networks (e.g., GSM networks). The server system 122 comprises software components and databases that can be deployed at one or more data centers 121 in one or more geographic locations. The software components can comprise subcomponents that can execute on the same or on different individual data processing apparatus.

In various implementations, the primary server system 122 software components comprise an authentication module 112, a channel manager 114, a channel adapter 116, a rule-based system 118, and a machine learning system 120. The authentication module 112 authenticates customers, users or both with the server system 122 and, optionally, with a selected communication channel (e.g., $OTT_2$ 162). The channel manager 114 is responsible for selecting communication channels to use and for facilitating communication between customers and users. An application programming interface (API) can be used by customers' computer systems (e.g., customer 140) to communicate with the channel manager 114. The API can be provided to customers in a software library (e.g., in a software development kit or SDK). In some implementations, the API implements a communication protocol that supports message sending and authentication. (The API will be described further below.) The channel adaptor 116 communicates with the service (e.g., $OTT_1$ 161) for a communication channel selected by the channel manager 114 in order to send and receive messages on the selected channel and, optionally, perform authentication. The rule-based system 118 and the machine learning system 120, discussed further below, are systems that can be used by the channel manager 114 to select a communication channel to use for a given communication. The server system 122 databases comprise a channel data database 130, user data database 132, channel selection rules database 134, and transaction data database 136. The databases can reside in one or more physical storage systems. (The databases are further described below.)

Client devices (e.g., client device 150) execute one or more software applications that allow users (e.g., user 149) to obtain and send messages, and establish other types of communications such as voice and video calls. For example, software applications 155, 151, 152, and 153 on the client device 150 allow the user 149 to communicate using SMS, $OTT_1$, $OTT_2$ and $OTT_3$, respectively. The client device 150 can be a data processing apparatus such as a mobile phone, a smart watch, a tablet computer, a personal computer, a game console, or an in-car media system. Other examples of client devices are possible.

The customer 140 computer system sends a request for transmitting a message to the server system 122 using a communication protocol implemented by the aforementioned API. In some implementations, API requests are submitted by the customer 140 to the server system 122 using Hypertext Transfer Protocol (HTTP) POST or GET methods where the parameters of the requests are in External Markup Language (XML) or JavaScript Object Notation (JSON) format. By way of illustration, a request to send a message to a user can include the following parameters: message content, optional authentication information, identification of the sender and the recipient of the message, and a message content type. Other parameters are possible. The message content type can indicate that the message is text or rich media (e.g., an image, video, audio, executable code, or programming language statements). If the message content type is rich media, the message can in some implementations include an address (e.g., a uniform resource locator address) from which the message can be obtained by the message recipient. That is, the request does not need to include the message content itself.

tion information parameter of the request using public key cryptography. Other types of authentication are possible.

The channel manager 114 is a software component that selects a communication channel for transmitting the message based on one or more properties. The properties are stored in the channel data 130 database for access by the channel manager 114. In some implementations, the channel properties can include one or more of those listed below in TABLE 1. Other channel properties are possible.

TABLE 1

| Property | Description |
| --- | --- |
| Quality of Service | A measure of the performance of the channel based on message delivery failure rate, transmission delay, queues, maintenance periods, delivery confirmation, packet loss, available features (e.g., text vs. rich-media content), or OTT restrictions. |
| Delivery Receipts | A measure of availability of a delivery receipt and how long it takes on average for a delivery receipt to be received indicating delivery of the message to the user on the channel. This measure can further be based on accuracy and content (e.g., message delivered, message read) of a delivery receipt |
| Reachability of Recipient | A measure of the likelihood that the message will be viewed by the user on the channel. This measure can further be based on the day of the week and time of day, holidays, and validity of parameters provided, recipient account status, purpose and nature of a recipient account in relation to the message type, content of the message, or channel restriction, for example. |
| Communication Regulations, Laws, or Regional Requirements | An indication of whether the channel can be used based on the content type, country or region that recipient is located, country or region that sender is located, time of the day, sender identification in message, length of numbers, length of message, export or import restriction, privacy, or data security. |
| Cost | The cost of delivering a message on a particular channel based on cost information provided by the channel service, or whether revenue can be obtained by the sender via the channel. |
| User Preferences | An indication of whether the recipient favors the channel for communication, an order of attempted channels, or type of message. |

In various implementations, the sender, the recipient, or both can be specified in a Uniform Resource Identifier (URI) format. In some implementations, the URI format is as follows (however other URI formats are possible):

<scheme>:<channel>:<user identifier>

The scheme field specifies a type of communication channel, for example, "OTT" for an OTT channel, "SMS" for an SMS channel, or "PSTN" for a public telephone network. Other types of communication schemes are possible. The channel field specifies a particular service for the communication channel, for example, "WeChat" for the WeChat messaging service, "LINE" for LINE messaging service, or "tel" for telephone service. The user identifier field specifies the user identifier of the recipient for the particular service. The user identifier can be a phone number of a user, a user account name (e.g., a text string) for the particular channel, or an identifier that can be mapped to an identifier for the channel. In some implementations, the sender is specified using a key or a Uniform Resource Locator (URL) address of the sender, for example.

The server system 122 receives the request to send the message from the customer 140 and optionally authenticates the request. The message can be sent on the scheme:channel specified by the sender identification or the server system 122 can select a scheme:channel (using the channel manager 114) to send the message on. The authentication module 112 is a software component that validates that the request was submitted by an authorized user of the server system 122. For instance, the authentication module 112 can authenticate one or more cryptographic keys included in the authentica- The channel manager 114 can determine one or more of the properties in TABLE 1 by observing how a given channel behaves over time for a given user or multiple users.

The channel manager 114 can also select a communication channel based on the sender's identification (the customer 140) or additional criteria specified by the sender. For instance, the sender may have an upper limit (e.g., $0.05, or $0.00) on a cost to send a message. As for another example, the sender may have a preference for one OTT channel over another OTT channel, or in SMS messaging over an OTT channel.

In some implementations, the channel manager 114 selects a communication channel based on evaluation of one or more rules using the rule-based system 118. Each rule in the rule-based system 118 includes one or more required properties for the message, and a channel suitable for the required properties. A required property for the message can be the content type (e.g., text or rich-media), a cost limit specified by the sender, or a delivery success rate specified by the sender, or the value of a property listed in TABLE 1. Other required properties for the message are possible. The required properties can be determined by metadata (e.g., the content type, the sender) of the message.

The set of rules can be stored in the channel selection rules database 134. By way of illustration, assume that there are four required properties A, B, C, and D. The set of rules can include:

| Rule | Required properties | Channel |
|------|---------------------|---------|
| #1   | A B C D             | $OTT_1$ |
| #2   | B C D               | $OTT_2$ |
| #3   | B D                 | $OTT_1$ |
| #4   | A                   | $OTT_3$ |
| #5   | B                   | $OTT_2$ |
| #6   | D                   | $OTT_2$ |

For instance, if the required properties for the message are B and D, the rule-based system 118 accesses the above set of rules (stored in the channel selection rules database 134) and selects the channel $OTT_1$ for transmitting the message. If the required properties for the message are A only, the rule-based system 118 accesses the above set of rules and selects the channel $OTT_3$ for transmitting the message. The rule-based system 118 can provide the selected channel to the channel manager 114 that manages transmitting the message through the selected channel, as will be further described later. In some implementations, each rule corresponds to an ordered list of communication channels, including a primary channel and one or more secondary channels. The secondary channels serve as failover channels if transmission through the primary channel is unsuccessful. Failover will be described in further detail later.

The machine-learning system 120 is a software component that periodically updates the rules stored in the channel selection rules 134 based on past performance data for each property on each of the communication channels (e.g., properties described in TABLE 1 above). For instance, the machine-learning system 120 can access the transaction data database 136 for performance data for the past 5 minutes (or past one hour, past week, past month). For instance, if a particular property under consideration is the content type of rich-media, performance data of a particular channel for this particular property can be numbers of success and failed transmissions of rich-media messages through the particular channel in the past 5 minutes. As for another example, if a particular property under consideration is the quality of service of a particular channel, performance data for this particular property can be the number of events when the particular channel is unavailable or the number of messages that were automatically sent (failover) through other channels in the past hour. Other examples of past performance data for a particular channel can include downtime, user availability, cost efficiency, revenue efficiency, and automatic failover after a specified amount of latency (or queuing, packet loss). The machine-learning system 120 uses the past performance data as input to a machine-learning algorithm to update the channel-selection rules stored in the channel selection rules database 134. The machine-learning algorithm can be association rule learning algorithms such as Apriori algorithm and FP (frequency pattern) growth algorithm, or supervised learning algorithm such as decision trees, support vector machine, or kernel estimation. Other machine-learning algorithms are possible.

Once the channel is selected by the channel manager 114, the message can be sent to the recipient using the channel adaptor 116. The channel adaptor 116 performs any necessary format conversion of the message content to make the message compatible with the selected channel and then sends the message to the recipient using a communication protocol specified by the selected channel. The transaction data database 136 can store transaction information for each request to send a message using a particular channel, such as identifiers for sender and recipient, message type, a transmission status (e.g., success or fail), delivery receipt, cost and payment for the transmission, and timestamp.

Figure 2A:
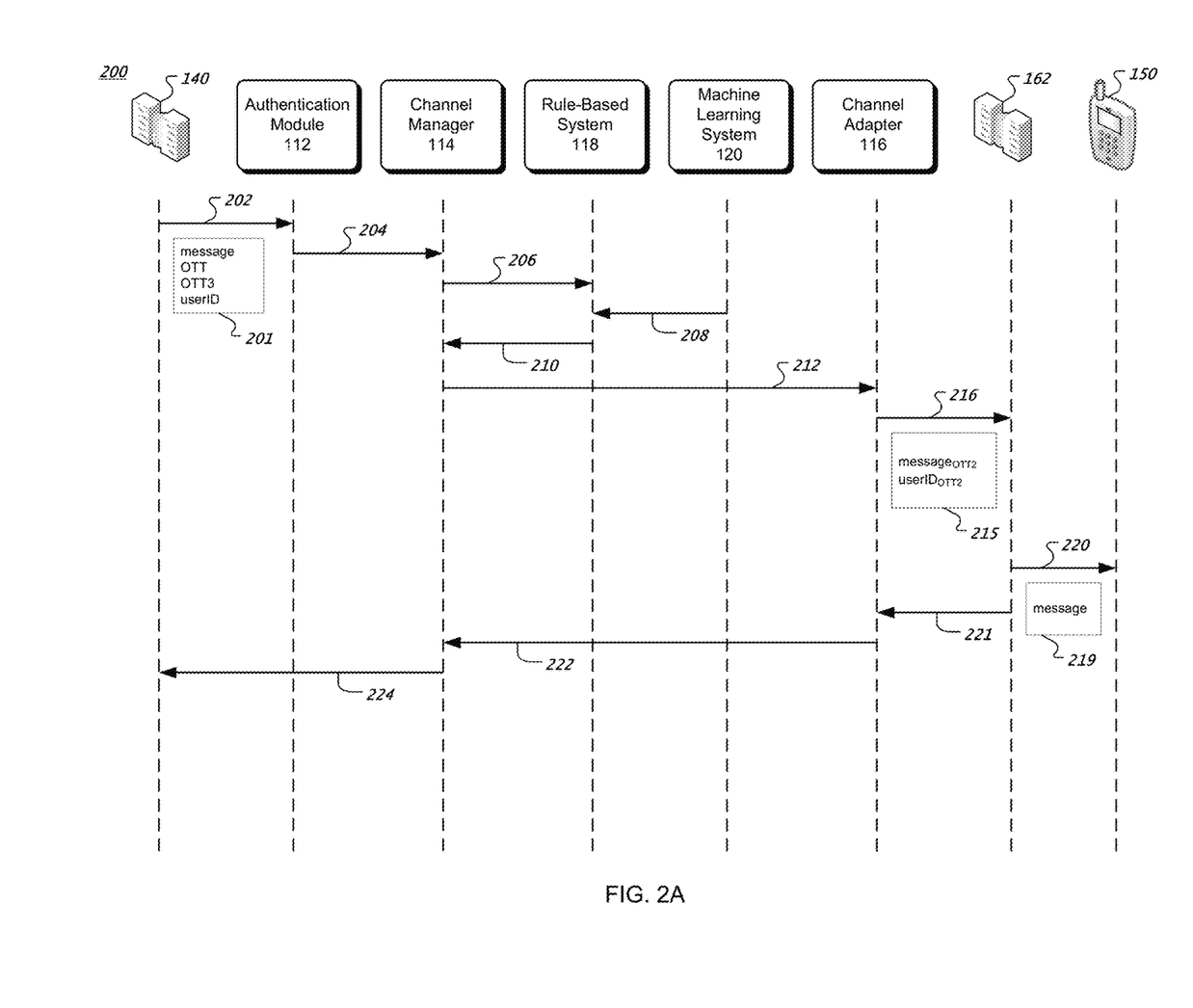
FIG. 2A is a data flow diagram of an example outbound message transmission.

FIG. 2A is a data flow diagram for an example transmission of an outbound message using the server system 122). In FIG. 2A, the customer 140 sends a request 201 to transmitting a message to the server system 122 using the aforementioned API (202). The request 201 can be submitted through HTTP POST or GET method using UTF-8 encoding and URL encoded values, for example. As described earlier, the request can specify an OTT channel such as $OTT_3$ 163, and a phone number (e.g., of the client device 150) as the user identifier for the user (recipient).

The authentication module 112 first authenticates the request 201 by using cryptographic keys included in the request 201, for example. After authenticating the request 201, the authentication module 112 forwards the request 201 to the channel manager 114 (204).

The channel manager 114 can determine available communication channels to reach the user. For instance, the channel manager 114 can access the user data database 132 (based on the phone number) for available communication channels to reach the recipient. Available communication channels for a user can be obtained (e.g., by the channel manager 114 or another software component of the server system 122) based on transaction data of past message deliveries. The channel manager 114 can also send to servers of a particular messaging service provider a message including the phone number (e.g., using an API of the particular messaging service provider), requesting a confirmation on whether the user is reachable through the particular messaging channel, and in an implementation, obtaining a user identifier (of the user) for the particular messaging channel.

In some implementations, the channel manager 114 sends to servers of a particular messaging service provider a message (e.g., using an API of the particular messaging service provider), requesting a confirmation on whether the particular messaging service accepting messages originated from the sender (the customer 140). For instance, the particular messaging service provider may only process messages from a business after the business have registered with the particular messaging service provider.

In some implementations, the channel manager 114 sends the available channels to the rule-based system 118 (206). The rule-based system 118 can select a communication channel based on rules for required properties of the message as described earlier, and provides the selected communication channel to the channel manager 114 (210). As the rule-based system 118 automatically selects a communication channel based on rules for required properties of the message, the selected communication channel is not necessarily the same communication channel (OTT3) specified by the customer 140. Optionally, the machine learning system 120 can use past performance data as input to a machine-learning algorithm to update the channel selection rules and provide the updated rules to the rule-based system 118 (208), for example, by updating the rules stored in the channel selection rules database 134.

The channel manager 114 can provide the selected communication channel (e.g., OTT2) and the request 201 to the channel adapter 116 (212). The channel adapter 116 translates the request 201 to a request 215 (to transmit the message) according to a protocol (e.g., an API) for the selected communication channel. For instance, the request 215 can include the message from the request 201 in a format based the protocol of the OTT2 channel, and a user identifier (of the user) for the OTT2 channel. The request 215 can also include an identifier for the customer 140 such that a future reply message in reference to the request 215 can be directed toward back to the customer 140. The channel manager 114 then forwards the request 215 to servers of the OTT2 channel 162 (216). The servers of the OTT2 channel 162 then forward the message 219 to the client device 150 of the recipient (220). The user can access the message 219 from a user interface of the OTT2 application running on the client device 150.

In some implementations, the servers of the OTT2 channel 162 sends a delivery receipt (e.g., a notification confirming the delivery of the message to the client device 150) to the channel adapter 116 (221), based on the protocol of the OTT2 channel. The channel adapter 116 the forwards the delivery receipt to the channel manager 114 (222).

The channel manager 114 can send a response (to the original request 201) to the servers of the customer 140, for example, through the API of the server system 122 (224). The response can be structured data in JSON or XML format, for example. The response can include an identifier for the message, the channel through which the message was delivered (e.g., OTT2). The response can also include billing information such as payment and remaining balance, and an indication of the delivery receipt (or a status of successful delivery). If the message was not delivered successfully, the response can include a failed status, one or more reasons for the failed delivery (e.g., all available communications are busy, missing or invalid parameters in the original request, balance is too low, and so on). Meanwhile, the channel manager 114 can store transaction information for the request 202 in the transaction data database 136.

If the channel manager 114 determines that the message 215 is not delivered to the client device 150 (e.g., based on a notification from the servers 162), the channel manager 114 can select another communication channel to transmit the message. The channel manager 114 can select another communication channel based on one or more failover rules. The failover rules can identify one or more failover (or secondary) communication channels. The failover rules can be based on destination or client requirements (e.g., a client may limit a transmitting cost when the failover channel is SMS messaging). The failover rules can be based on past performance data. Identifying primary and secondary channels based on respective performance data is described in U.S. patent application Ser. No. 14/552,349, titled Identity and Phone Number Verification, filed 24 Nov. 2014, which is herein incorporated by reference in its entirety. Here, assuming that the selected (failover) channel is OOT1, the channel adapter 116 can translate the request 201 to another request for transmitting the message according to a protocol (e.g., an API) for the OTT1 channel. The channel manager 114 then forwards the other request to servers of the OTT1 channel, which in turns forwards the message to the client device 150. The user can access the message from a user interface of the OTT1 application running on the client device 150. The servers of the OTT1 channel can also provide a delivery confirmation to the channel manager 114 (via the channel adapter 116), which in turns can provides the delivery confirmation to the servers of the customer 140 (e.g., using the API of the server system 122).

Figure 2B:
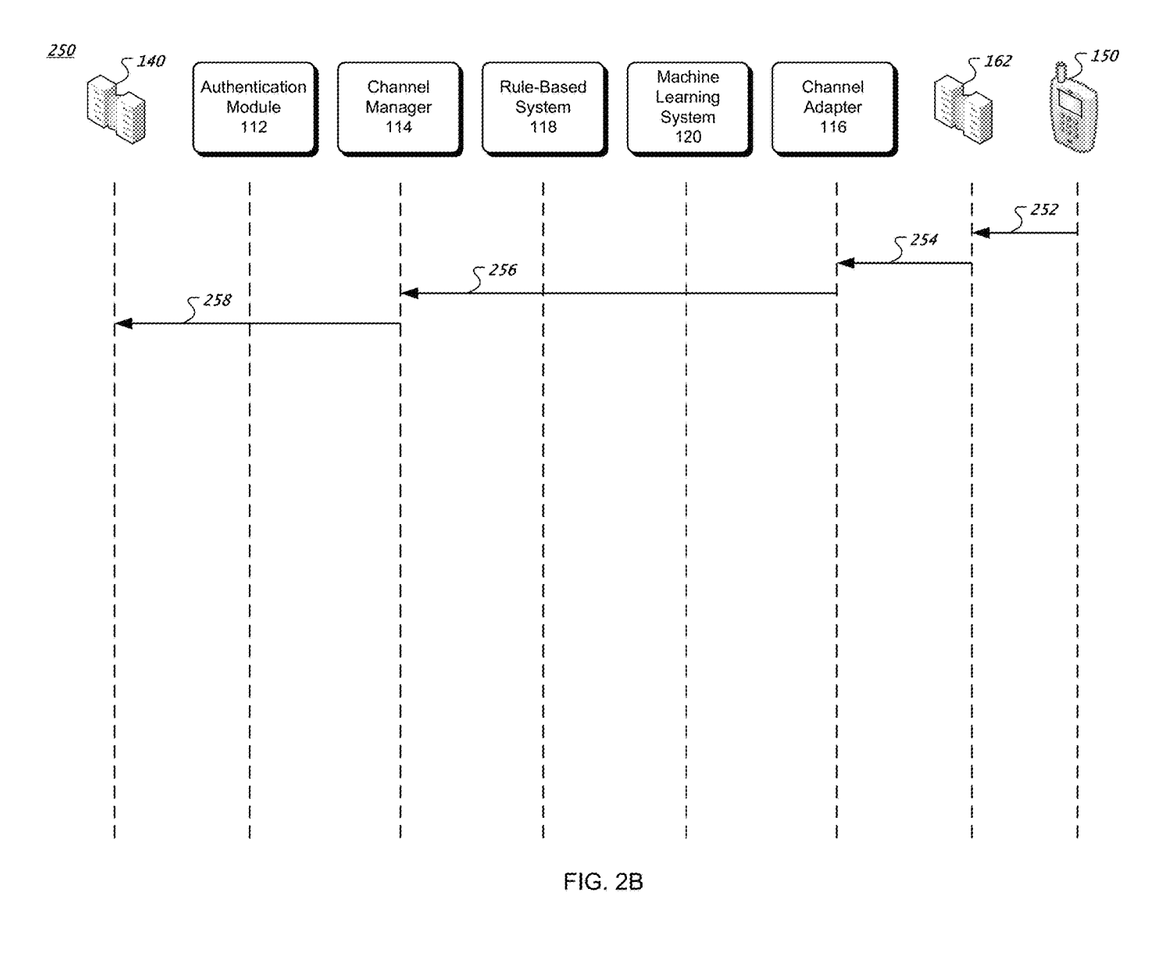
FIG. 2B is a data flow diagram of an example inbound message receipt.

FIG. 2B is a data flow diagram for transmitting an inbound message using the flexible message delivery system (the server system 122) in reference to FIG. 1. The user (the recipient) can send a reply message to the servers of the OTT2 channel 162 (252). The servers of the OTT channel 162 in turn send the reply message to the channel adapter 116 according to the protocol of the OTT2 channel (254). The servers of the OTT channel 162 can reference the original request 215 (FIG. 2A) and the identifier for the customers 140 included in the original request 215 (as described earlier), and indicate to the channel adapter 116 that the reply message is directed toward the customer 140. The channel adapter 116 provides the reply message to the channel manager 114 (256). The channel manager 114 then can forward the reply message to the servers of the customer 140 by using the API of the server system 122 (258). For instance, the channel manager 114 can send a request (e.g., via HTTP GET) to a call-back URL address of the servers of the customer 140. The request can include the user's identifier for the OTT2 channel (in the URI format described earlier), content type of the reply message, and the reply message.

Figure 3:
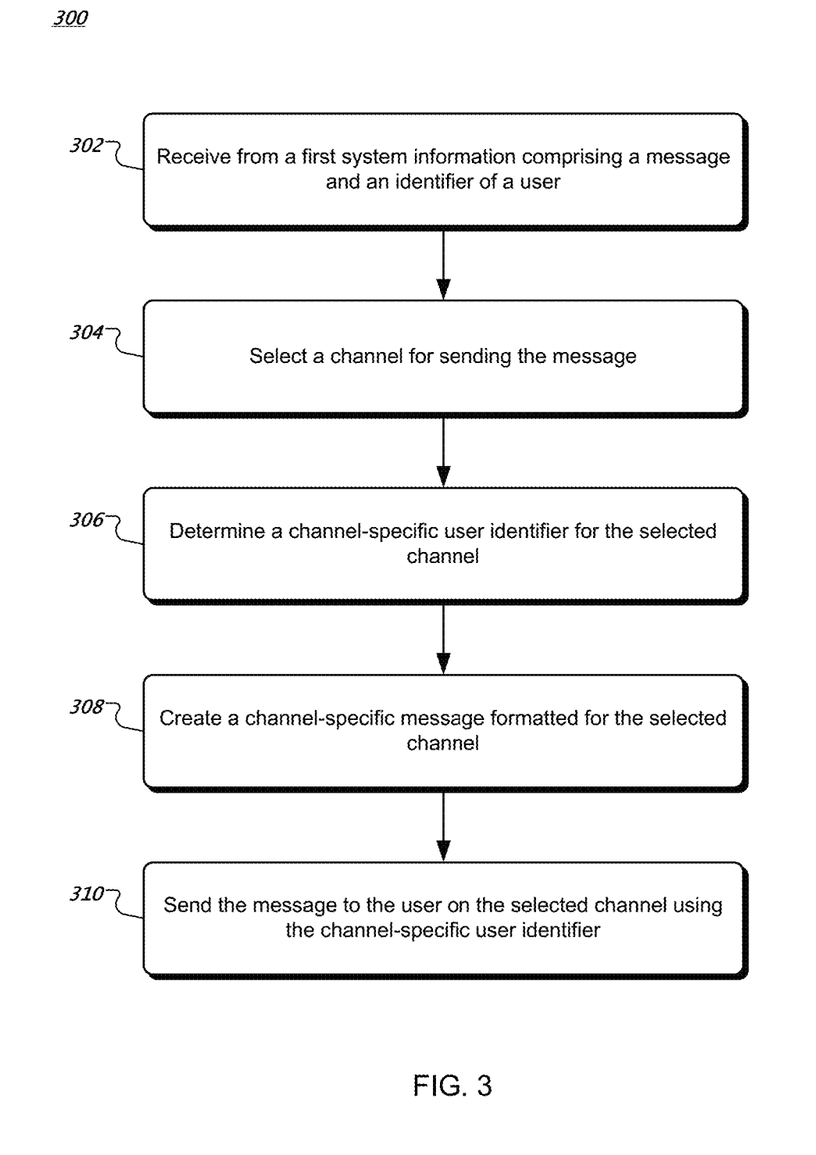
FIG. 3 is a flow chart of an example method for automatic channel selection.

FIG. 3 is a flow chart of an example method for flexible message delivery. The method can be implemented using software components executing on one or more data processing apparatus that are part of the data center 121 described earlier. The method begins by receiving from a first system information comprising a message and an identifier of a user (step 302; e.g., channel manager 114). The method selects a channel from a plurality of different third party communication channels for sending the message based on one or more properties of communications on the channel (step 304; e.g., channel manager). The method determines a channel-specific user identifier for the selected channel based on the identifier of the user (step 306; e.g., channel manager 114). The method creates a channel-specific message formatted for the selected channel based on the message (step 308; e.g., channel adapter 116). The method sends the message to the user on the selected channel using the channel-specific user identifier (step 310; e.g., channel adapter 116).

Figure 4:
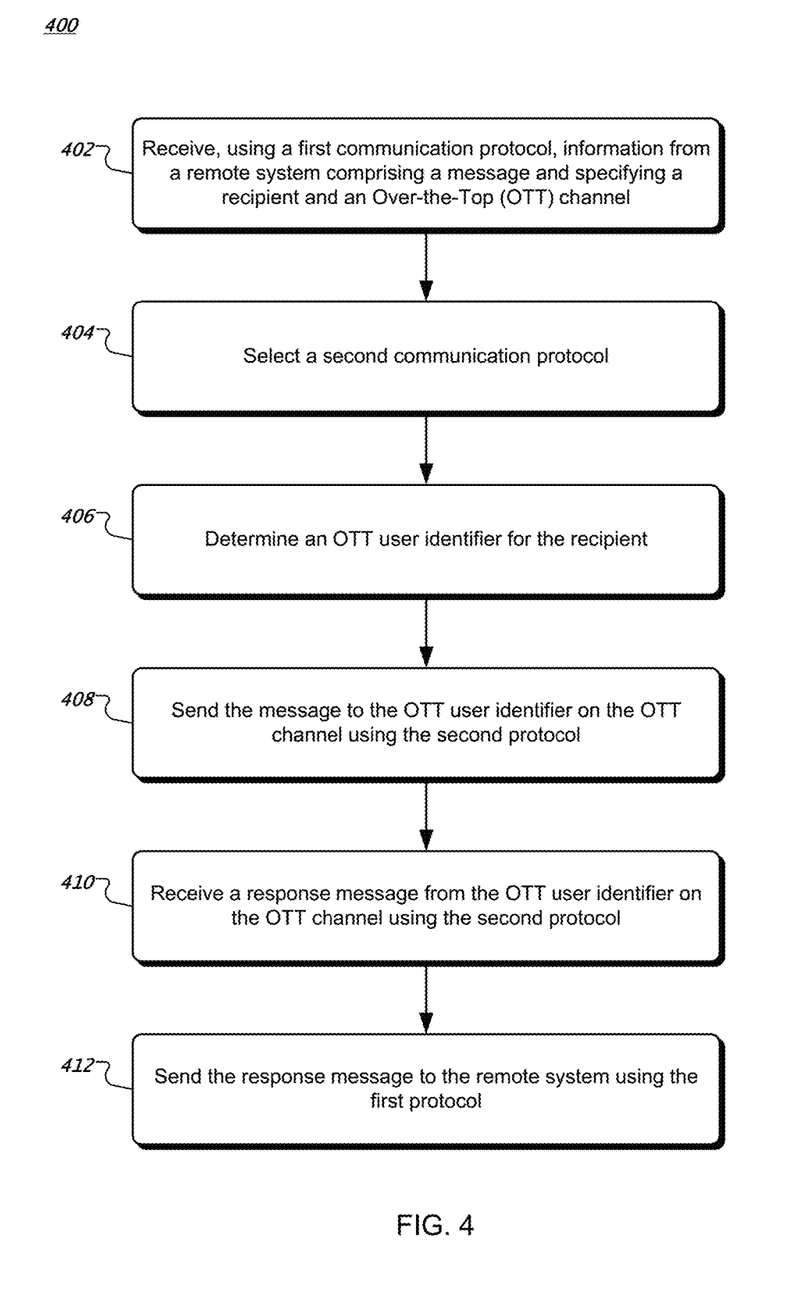
FIG. 4 is a flow chart of an example method for bidirectional communication.

FIG. 4 is a flow chart for another example method for flexible message delivery. The method can be implemented using software components executing on one or more data processing apparatus that are part of the data center 121 described earlier. The method begins by receiving, using a first communication protocol, information from a remote system comprising a message and specifying a recipient and an Over-the-Top (OTT) channel (step 402; channel manager 114). The method selects a second communication protocol from a plurality of different communication protocols based on the specified OTT channel wherein the first protocol is different from the second protocol (step 404; channel manager 114). The method determines an OTT user identifier for the recipient based on the OTT channel (step 406; channel manager 114). The method sends the message to the OTT user identifier on the OTT channel using the second protocol (step 408; channel adapter 116). The method receives a response message from the OTT user identifier on the OTT channel using the second protocol (step 410; channel adapter 116). The method sends the response message to the remote system using the first protocol (412).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving from a first system information comprising a message and an identifier of a user;
   selecting a channel from a plurality of different third party communication channels for sending the message to the user based on one or more properties of communications on the channel;
   determining a channel-specific user identifier for the selected channel based on the identifier of the user;
   creating a channel-specific message formatted for the selected channel based on the message;
   sending the channel-specific message to the user on the selected channel using the channel-specific user identifier;
   receiving a second message from the user on the selected channel in response to the channel-specific message; and
   forwarding the second message to the first system,
   wherein the receiving, selecting, determining, creating, sending, and forwarding steps are performed by one or more computers.

2. The method of claim 1 wherein sending the message further comprises:
   verifying that credentials received from the first system during the receiving step are valid for the first system; and
   after verifying that the credentials for the first system are valid, sending the channel-specific message.

3. The method of claim 1 wherein the selected channel is a social network and wherein the channel-specific user identifier is a user account name on the social network.

4. A storage device having instructions stored thereon that when executed by one or more computers perform operations comprising:
   receiving from a first system information comprising a message and an identifier of a user;
   selecting a channel from a plurality of different third party communication channels for sending the message to the user based on one or more properties of communications on the channel;
   determining a channel-specific user identifier for the selected channel based on the identifier of the user;
   creating a channel-specific message formatted for the selected channel based on the message;
   sending the channel-specific message to the user on the selected channel using the channel-specific user identifier;
   receiving a second message from the user on the selected channel in response to the channel-specific message; and
   forwarding the second message to the first system.

5. The method of claim 1 wherein the identifier of the user comprises a telephone number.

6. The method of claim 1 wherein a particular third party communication channel is an over-the-top provider, GSM, or a public switched telephone network.

7. The method of claim 1, further comprising:
   receiving from a second system information comprising a second message, an identifier of a second user, and an identifier of a particular channel; and
   sending the second message to the second user on the particular channel.

8. The method of claim 1 wherein a particular property of communications on the channel comprises a cost to send a message on the channel, a payment made to a sender of a message through the channel, a quality of service of the channel, the availability of delivery receipts via the channel, or reachability of the user through the channel.

9. The method of claim 1 wherein selecting a channel from a plurality of different channels for sending the message based on one or more properties of communications on the channel comprises:
   selecting a particular channel using a rule-based system wherein a particular rule of the rule-based system corresponds to a set of one or more required properties for the message.

10. The method of claim 9, wherein the required properties are determined by metadata associated with at least the message.

11. The method of claim 10, wherein one or more rules of the rule-based system are periodically updated by a machine learning system with input comprising respective past performance data for at least one property on each of the plurality of third party communication channels.

12. The method of claim 1, further comprising:
determining that the sending failed and based thereon:
selecting a second channel from the plurality of channels;
determining a second channel-specific user identifier for the user;
creating a second channel-specific message formatted for the second channel based on the message; and
sending the second channel-specific message to the user on the second channel using the second channel-specific user identifier.

13. The method of claim 1 wherein the message comprises one or more of text, an image, video, audio, executable code, and programming language statements.

14. The method of claim 1, wherein the determined channel-specific user identifier is not a telephone number or a device identification number assigned to a telephony device or a computing device associated with the user.

15. A system comprising:
one or more computers programmed to perform operations comprising:
receiving from a first system information comprising a message and an identifier of a user;
selecting a channel from a plurality of different third party communication channels for sending the message to the user based on one or more properties of communications on the channel;
determining a channel-specific user identifier for the selected channel based on the identifier of the user;
creating a channel-specific message formatted for the selected channel based on the message;
sending the channel-specific message to the user on the selected channel using the channel-specific user identifier;
receiving a second message from the user on the selected channel in response to the channel-specific message; and
forwarding the second message to the first system.

16. The system of claim 15 wherein sending the channel-specific message further comprises:
verifying that credentials received from the first system during the receiving step are valid for the first system; and
after verifying that the credentials for the first system are valid, sending the channel-specific message.

17. The system of claim 15 wherein the selected channel is a social network and wherein the channel-specific user identifier is a user account name on the social network.

18. The system of claim 15 wherein the identifier of the user comprises a telephone number.

19. The system of claim 15 wherein a particular third party communication channel is an over-the-top provider, GSM, or a public switched telephone network.

20. The system of claim 15, wherein the operations further comprise:
receiving from a second system information comprising a second message, an identifier of a second user, and an identifier of a particular channel; and
sending the second message to the second user on the particular channel.

21. The system of claim 15 wherein a particular property of communications on the channel comprises a cost to send a message on the channel, a payment made to a sender of a message through the channel, a quality of service of the channel, delivery receipts, or reachability of the user through the channel.

22. The system of claim 15 wherein selecting a channel from a plurality of different channels for sending the message based on one or more properties of communications on the channel comprises:
selecting a particular channel using a rule-based system wherein a particular rule of the rule-based system corresponds to a set of one or more required properties for the message.

23. The system of claim 22, wherein the required properties are determined by metadata associated with at least the message.

24. The system of claim 23, wherein one or more rules of the rule-based system are periodically updated by a machine learning system with input comprising respective past performance data for at least one property on each of the plurality of third party communication channels.

25. The system of claim 15, wherein the operations further comprise:
determining that the sending failed and based thereon:
selecting a second channel from the plurality of channels;
determining a second channel-specific user identifier for the user;
creating a second channel-specific message formatted for the second channel based on the message; and
sending the second channel-specific message to the user on the second channel using the second channel-specific user identifier.

26. The system of claim 15 wherein the message comprises one or more of text, an image, video, audio, executable code, and programming language statements.

27. The system of claim 15, wherein the determined channel-specific user identifier is not a telephone number or a device identification number assigned to a telephony device or a computing device associated with the user.

28. The storage device of claim 4, wherein the determined channel-specific user identifier is not a telephone number or a device identification number assigned to a telephony device or a computing device associated with the user.

* * * * *